(No Model.)

C. SCHNEIDER.
TOP PROP FOR CARRIAGES.

No. 577,324. Patented Feb. 16, 1897.

WITNESSES:
Geo. H. Snyder
B. F. Funk

INVENTOR
C. Schneider
BY
L. G. Susemihl,
ATTORNEY.

THE NORRIS PETERS CO., PHOTO-LITHO., WASHINGTON, D. C.

UNITED STATES PATENT OFFICE.

CHRISTIAN SCHNEIDER, OF DAVENPORT, IOWA.

TOP-PROP FOR CARRIAGES.

SPECIFICATION forming part of Letters Patent No. 577,324, dated February 16, 1897.

Application filed November 28, 1896. Serial No. 613,829. (No model.)

*To all whom it may concern:*

Be it known that I, CHRISTIAN SCHNEIDER, a citizen of the United States, residing at Davenport, in the county of Scott and State of Iowa, have invented certain new and useful Improvements in Top-Props for Carriages; and I do hereby declare the following to be a full, clear, and exact description of the invention, such as will enable others skilled in the art to which it appertains to make and use the same.

My invention relates to an improvement in vehicle-tops; and it consists in a grooved screw-bolt which is attached to the carriage-bow and over which the lower end of one of the arms or braces is made to pass, and a washer provided with a tooth or projection on its inner edge to catch in the groove in the screw-bolt, combined with a spring-washer, which is also passed over the end of the screw-bolt, a plain washer which bears against the end of the spring-washer, a nut or button which screws upon the end of the bolt, and a spring-actuated collar placed between the end of the arm and the nut or button, all of which will be more fully described hereinafter.

The object of my invention is to substitute a spring-washer for the leather washers heretofore used and to secure the spring-washer in position upon the bolt so that it will not turn and to provide a neat carriage button or nut which will hold the arms on a carriage or buggy top firmly in place and prevent rattling, as is the case where leather washers are used.

Figure 1:
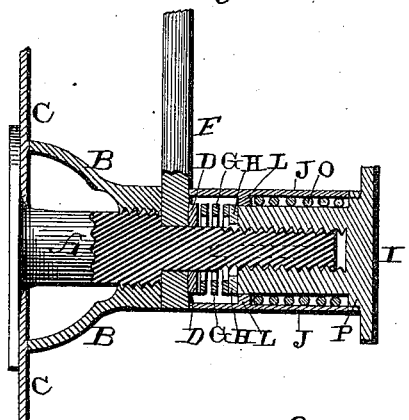
Figure 2:
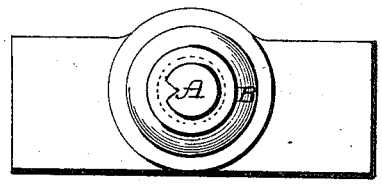
Figure 3:
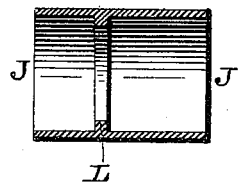

In the accompanying drawings, Figure 1 is a vertical section of a device embodying my invention. Figs. 2 and 3 are detail views of the different parts.

A represents the bolt, which is attached to the side of the carriage or buggy bow in the usual manner, and over which the clamping-sleeve B is placed in the usual manner. Between this sleeve and the head of the bolt a portion of the flexible cover of the top is made to catch in the usual manner. From just beyond the end of the sleeve the bolt is grooved out to its end, and in this groove a toothed washer D is made to catch. This washer D bears against the outer side of the arm F of the top and serves to prevent the spring-washer G, which has its ends to bear against the washer D, from turning with the arm F as the top is raised or lowered. By preventing this spring-washer from turning it is prevented from wear.

Passed over the outer end of the bolt A is the plain washer H, which bears against the outer end of the spring-washer, and against this washer H the nut or button I bears. The spring-washer is thus held between the two washers D H, which has no turning movement whatever, and hence no wear can come upon the spring-washer so as to cause it to become loose or worn out.

For the purpose of preventing the bolt and the spring-washer from becoming rusted or injured in any manner an inclosing collar J is used, and this collar J is provided with an internal flange L near its center, and which flange serves as a bearing for one end of the spring O, which is placed inside of the sleeve, and which spring O serves to keep the collar pressed against the arm F. The other end of the spring O bears against the shoulder P, upon the nut or button I, and the pressure of the spring O against the flange L, while it keeps the collar in position, allows it to have a slight endwise play. As the nut or button I is screwed into position the spring-washer G is compressed between the two washers D H, and the spring O is compressed at the same time.

The nut or button, spring, and collar are together placed over the screw-threaded end of the bolt, upon which the spring-washer G and the two washers D H and the arm F have already been placed. The spring-washer takes the place of the leather washers heretofore used, and although indirectly pressing with considerable force against the arm it will not turn when said arm is turned because of the interposed washer D, which is prevented from turning on the bolt by its tooth, which catches in the groove. The collar having the spiral spring placed inside of it is pressed against the arm by the spring, thus keeping the washers nicely incased.

Where leather washers are used, they soon become worn or dried up, so as to become loose and allow the parts to rattle. As will be seen, all leather is done away with and only parts made of metal are used. As no wear is brought to bear upon any part except the washer D it will readily be seen that the parts will never be worn out, and after having been once adjusted in position need never be again changed.

Having thus described my invention, I claim—

1. In a button or nut for vehicle-tops, a grooved bolt, a nut or button which screws upon the bolt, a washer provided with a tooth to catch in the groove, a spring-washer which bears against the toothed washer, and which is compressed by the nut or button, substantially as shown.

2. A grooved bolt, the arm F, passed thereover, the toothed washer, and the spring-washer which bears against the toothed washer upon the end of the bolt, combined with a second washer H, placed against the outer end of the spring-washer and the nut or button which screws upon the end of the bolt, substantially as described.

3. In a nut or button for vehicle-tops, a spring-actuated sleeve for inclosing the operating parts, and which sleeve is held between the arm of the top and the nut or button, substantially as set forth.

4. In a vehicle-top, the grooved bolt, the clamping-sleeve placed thereon, the arm F, of the top, the two washers D, H, placed upon the bolt, and the spring-washer, combined with the button or nut, and the spring-actuated inclosing sleeve which protects the parts, substantially as specified.

In testimony whereof I have affixed my signature in presence of two witnesses.

CHRISTIAN SCHNEIDER.

Witnesses:
JESSIE A. MURPHY,
I. C. ANDERSON.